United States Patent
Currans et al.

(10) Patent No.: US 8,934,135 B2
(45) Date of Patent: Jan. 13, 2015

(54) CONTROLLING PRINTING OF A DOCUMENT THAT MAY CONTAIN MICR CHARACTERS

(75) Inventors: Kevin G Currans, Philomath, OR (US); Jose M Galmes, San Diego, CA (US); Jon Derek Roller, Corvallis, OR (US); John A Bertani, Corvallis, OR (US); Steve Brown, Albany, OR (US); Stephen L Albright, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 864 days.

(21) Appl. No.: 13/155,839

(22) Filed: Jun. 8, 2011

(65) Prior Publication Data

US 2012/0313778 A1    Dec. 13, 2012

(51) Int. Cl.
*H04N 1/60* (2006.01)
*G06F 3/12* (2006.01)
*G08B 21/00* (2006.01)

(52) U.S. Cl.
USPC ............ 358/1.9; 358/1.15; 358/500; 340/540

(58) Field of Classification Search
USPC ............... 340/540, 568.7; 358/1.1, 1.18, 500, 358/1.15, 1.19; 382/1.9, 1.14, 112, 139, 382/140, 209, 292; 235/379, 439, 449; 270/52.01, 52.02; 399/12, 80, 81
See application file for complete search history.

(56) References Cited

U.S. PATENT DOCUMENTS

| | | | |
|---|---|---|---|
| 5,521,722 A * | 5/1996 | Colvill et al. ................. | 358/500 |
| 6,195,453 B1 | 2/2001 | Simonoff | |
| 6,986,464 B2 | 1/2006 | Takiguchi et al. | |
| 7,092,561 B2 | 8/2006 | Downs, Jr. | |
| 7,386,160 B2 * | 6/2008 | Prakash et al. ................ | 382/140 |
| 7,466,442 B2 | 12/2008 | Chapman | |
| 7,499,580 B2 * | 3/2009 | Prakash et al. ................ | 382/140 |
| 7,587,066 B2 | 9/2009 | Cordery et al. | |
| 8,032,037 B2 * | 10/2011 | Kitazawa et al. ............... | 399/12 |
| 8,131,163 B2 * | 3/2012 | Matsui et al. ................... | 399/12 |
| 8,615,124 B2 * | 12/2013 | Faulkner et al. .............. | 382/139 |
| 2005/0018214 A1 | 1/2005 | DeWitt et al. | |

* cited by examiner

*Primary Examiner* — Van T. Trieu
(74) *Attorney, Agent, or Firm* — Trop, Pruner & Hu, P.C.; Fred G. Pruner, Jr.

(57) ABSTRACT

A technique includes in a machine, processing data indicative of a document to be printed by a printer and which may contain magnetic ink character recognition (MICR) characters to determine whether the data indicates any MICR characters. The technique includes comparing a result of the determination to an intent indicated by a job ticket associated with the document; and controlling the printing of the document by the printer, including selectively performing corrective action in response to the comparison.

20 Claims, 3 Drawing Sheets

CONTROLLING PRINTING OF A DOCUMENT THAT MAY CONTAIN MICR CHARACTERS

BACKGROUND

For purposes of facilitating the rapid scanning of account information from a document, such as a negotiable instrument, by an electronic reader or sorter, magnetic ink character recognition (MICR) characters typically are printed on the document, which identify the account information. MICR characters typically are printed on a document using a special type of ink or toner, which contains magnetic particles; have a predefined font, such as the E-13B or the CMC-7 font; and may appear in a predefined area of the document. The MICR specifications are defined in American National Standards Institute (ANSI) document nos. X9.100-187-2008 and X9.100-180-2006.

DETAILED DESCRIPTION

Systems and techniques are disclosed herein for purposes of controlling the printing of documents that may contain magnetic ink character recognition (MICR) characters.

One way to produce documents containing MICR characters involves first printing shell documents that contain the MICR characters and then later printing additional information on these shell documents. A particular advantage of such a technique is that the printing press operator may relatively easily verify whether the MICR characters are in fact being printed on the shell documents or have been printed on the shell documents before the additional printing job to add the additional non-MICR character information. In this manner, given the relatively high rate (a rate on the order of 400 feet per minute, for example) at which a commercial printing press operates, it may be challenging for the operator to visually verify correct printing of the MICR characters during a current printing job if the document contains MICR and non-MICR characters. It is noted that a significant amount of cost and/or fines may be incurred for which the printing press company may be responsible if the company erroneously prints negotiable instruments that do not contain MICR characters; prints negotiable instruments that contain characters that are in the MICR fonts but are not printed with the MICR ink or toner; or if the printing does not produce characters with a strong enough magnetic signal to be properly read.

There are particular advantages, however, to printing MICR and non-MICR characters with in the same printing job, as the MICR characters are, in general, not confined to predetermined areas of the document, and the overall printing time is significantly reduced.

Systems and techniques are disclosed herein for automatically controlling the printing of documents that may or may not contain MICR characters in a manner that allows MICR and non-MICR characters to be printed on the same document in the same printing job, while ensuring that the characters that are printed on the document corresponds to the specified printing intent.

Figure 1:
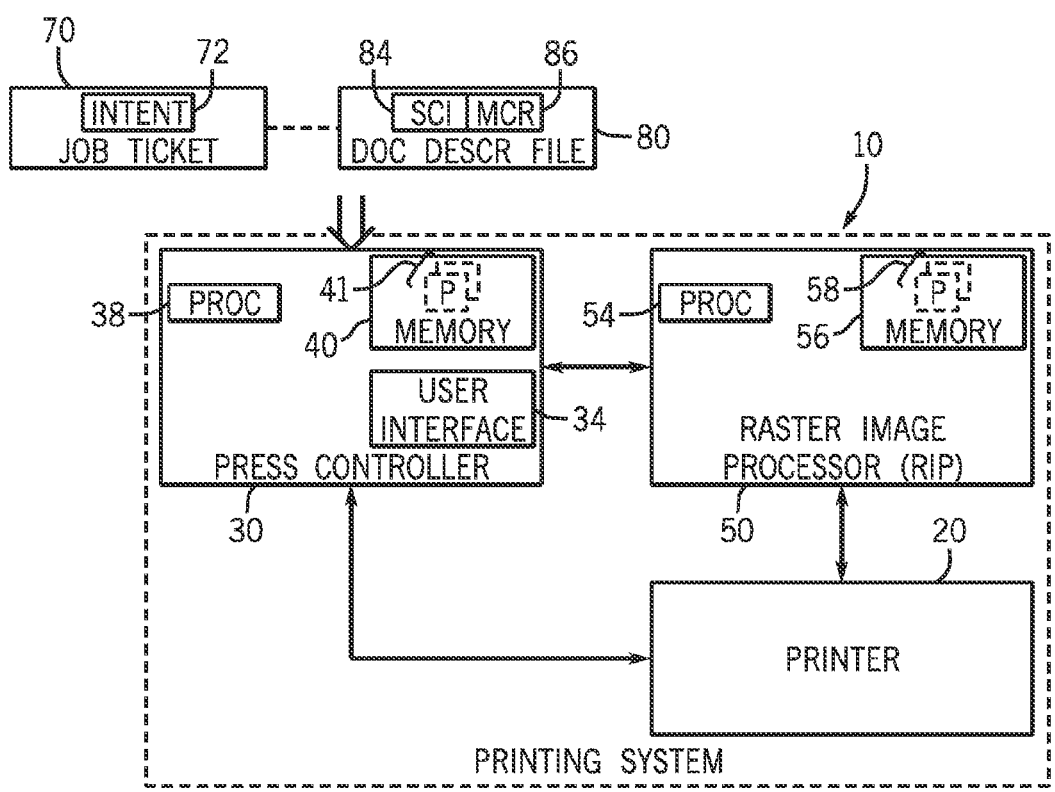
FIG. 1 is a schematic diagram of a printing system according to an example implementation.

Referring to FIG. 1, in accordance with exemplary implementations that are described herein, a given document to be printed by a printing press system or, "printing system 10," may be electronically described by data that conforms to a particular document description language format, such as the portable document format .pdf. As a non-limiting example, a particular document to be printed may be described via a document description file 80 (a .pdf document, for example), which contains spot color indicators for purposes of identifying MICR characters in the document. For example, as depicted in FIG. 1, an exemplary set of MICR characters 86 described by the document description file 80 is marked in the file 80 by an associated spot color indicator 84 (i.e., an indicator that marks characters to be printed with a MICR font and with a magnetic particle-based toner or ink).

Figure 2:
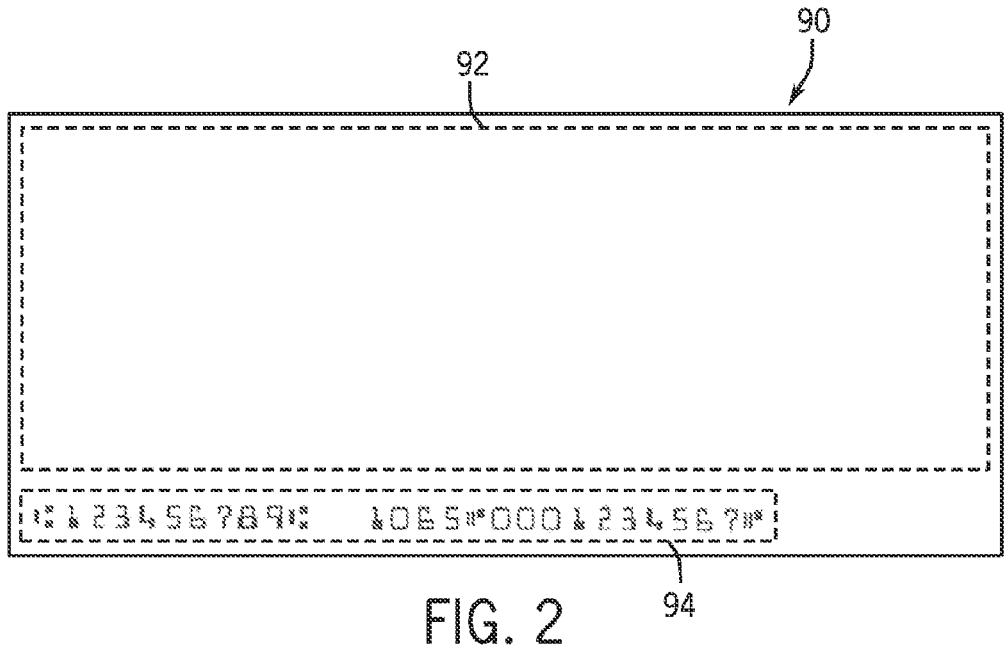
FIG. 2 is an illustration of a document that contains MICR characters according to an example implementation.

As a non-limiting example, the document description file 80 may describe a check 90 (see FIG. 2) that contains one or multiple regions 92 of non-MICR characters and one or multiple regions 94 (one region 94 being depicted in FIG. 2) of MICR characters. Ideally, the document description file 80 contains one or multiple spot color indicators 84 that mark characters in the file 80 corresponding to the region 94 as being MICR characters.

As depicted in FIG. 1, when communicated to the printing system 10, the document description file 80 may be accompanied by a job ticket (an XML file, for example), which contains various information specified to the printing job used to print the document that is described by the file 80. As non-limiting examples, the job ticket 70 may indicate a page range of the document to be printed; media on which the document is to be printed; a color space for the document; selection of single or double sided printing; selection of various finishing aspects, such as collation or insertion of blank pages; and so forth. The job ticket 70 also includes data indicative of an intent 72 of the printing job. Among other aspects, the intent 72 indicates whether or not the document contains MICR characters. Thus, as an example, if the document descriptor file 80 describes a check 90 (see FIG. 2) to be printed, then ideally, the file 80 contains MICR spot color indicators marking MICR characters, and the corresponding intent 72 indicates that a check is being printed (i.e., indicates the intent for MICR characters to be printed on the document).

It is entirely possible that the intent 72 and the document description file 80 may erroneously disagree regarding the indicated presence or absence of MICR characters. In this manner, two possible errors may occur in connection with printing documents that may or may not contain MICR characters: 1.) the intent 72 indicates that MICR characters are to be printed, and the corresponding document description file 80 fails to contain any MICR spot color indicators and thus, fails to identify any MICR characters; or 2.) the intent 72 indicates that no MICR characters are to be printed, and the document description file 80 contains MICR spot color indicators that identify certain characters as being MICR characters.

In the absence of the systems and techniques that are disclosed herein, for the first error, the press operator may fail to realize that MICR characters are not being printed, due to the relatively high speed of the printing press. Therefore, although the press operator may set up the printing system 10 for MICR character printing (in accordance with the intent 72), the MICR characters are not printed due to the failure of the MICR characters to be identified by the document description file 80. In the absence of the systems and techniques that are disclosed herein, for the second error, the press operator may fail to set up the printing system 10 to print MICR characters (due to the indicated intent 72), even though the document description file 80 contains MICR spot color indicators.

Figure 3:
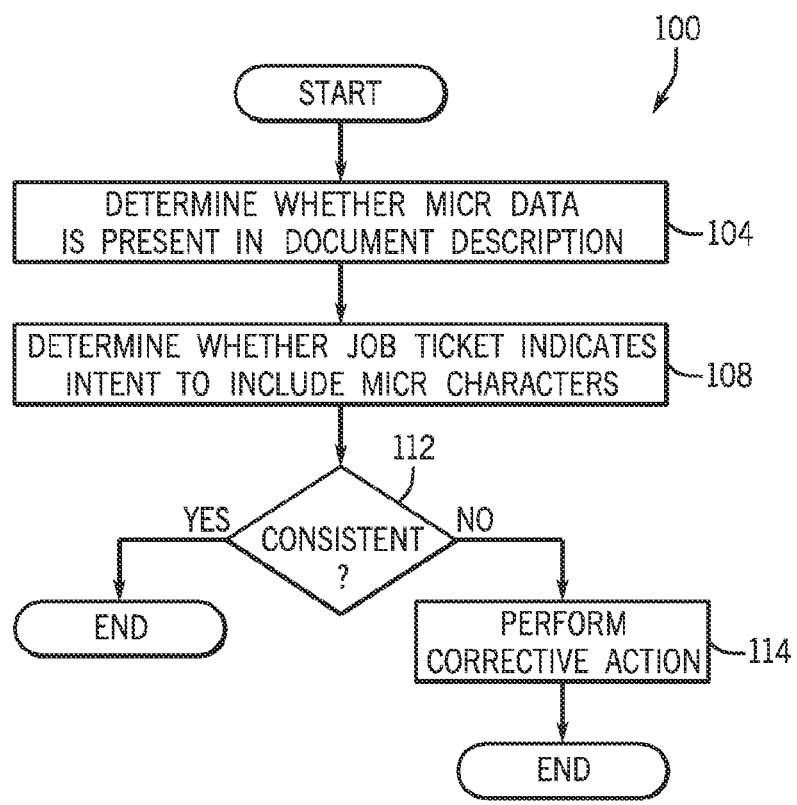
FIGS. 3 and 4 are flow diagrams depicting techniques to control printing of a document that may contain MICR characters according to example implementations.

As described herein, the printing system 10 is constructed to automatically compare the intent 72 indicated by the job ticket 70 with the presence or absence of MICR characters as indicated by document description file 80 and control whether printing of the document proceeds based on this comparison. More specifically, in accordance with some implementations, the printing system 10 performs a technique 100 that is generally depicted in FIG. 3. Referring to FIG. 3 in conjunction with FIG. 1, the printing system 10 determines (block 104) whether MICR data is present in the document description file and determines (block 108) whether the job ticket indicates an intent to include the MICR characters. If these two determinations disagree (diamond 112), the printing system 10 performs corrective action, pursuant to block 114. As further described below, this corrective action may involve halting the printing, alerting the press operator, etc.

Referring back to FIG. 1, as a more specific example, in accordance with some exemplary implementations, the printing system 10 includes a press controller 34, which receives document description files 80 and their associated job tickets 70 from a network, which may be a local area network (LAN), wide area network (WAN), the Internet, etc. The press controller 34 contains one or multiple processors 38 for purposes of processing each job ticket 70 and ensuring that the MICR character intent of the job ticket 70 is consistent with the spot colors that are indicated by associated document description file 80. It is noted that in other implementations, the press controller 34 may be formed entirely from non-processor-based hardware or a combination of processor-based hardware and non-processor-based hardware. Thus, many variations are contemplated and are within the scope of the appended claims.

As non-limiting examples, the one or multiple processors 38 may be central processing units (CPUs), CPU processing cores, etc. As also depicted in FIG. 1, the press controller 30 may include a memory 40, which stores one or multiple sets of machine executable instructions, or "programs," which are executed by the processor(s) 38 for purposes of performing techniques that are disclosed herein.

In general, the press controller 30 communicates with a printer 20 of the system 10, which prints the document that is described by the document description file 80 and communicates with a raster image processor (RIP) 50 of the system 10, which generates a display list that contains the data for the color planes being printed by the printer 20. The press controller 30 further creates a user interface 34 to set up, control and monitor the print job associated with printing the document that is described by the document description file 80.

In general, the user interface 34 (which may be displayed on a display or monitor of the printing system 10, for example) displays the status of the current print job as well as the various parameters selected for printing. In addition to these functions, in accordance with example implementations disclosed herein, the user interface 34 is configured to selectively provide at least two types of alerts to the human press operator should MICR character-based inconsistencies be detected: 1.) a first alert to notify the press operator that the intent 72 indicates that the document contains MICR characters but the corresponding document description file 80 does not contain any MICR spot color indicators; and 2.) a second alert to notify the press operator that the intent 72 indicates that the document does not contain MICR characters but the document description file 80 includes MICR spot color indicators. For both of these alerts, in accordance with example implementations, the press controller 30, via the user interface 34, delays printing until 1.) an override code is entered to allow printing to proceed with knowledge of the discrepancy or 2.) the problem is otherwise resolved. In this way, the printing system 10 is ensured that the press operator or the appropriate supervisor (who has knowledge of the override code) is aware of the MICR character inconsistencies between the job ticket intent 72 and the document description file 80.

Although the press controller 30 is depicted in FIG. 1 as being contained in a single box, it is understood that the press controller 30 may be formed from multiple components arranged on a rack, by local and remote nodes of a distributed processing system, etc. Thus, many variations are contemplated and are within the scope of the appended claims.

As noted above, the RIP 50 processes the document description file 80 to generate a display list that controls the printing by the printer 20. In general, the display list indicates the bit maps for each of the color planes that are employed in the printing process. As a non-limiting example, the printer 20 may be constructed to print in the following color planes: the cyan color plane, the magenta color plane, the yellow color plane, the black color plane and the MICR color plane (e.g., a black color plane using a black toner containing magnetic ink particles). Therefore, the RIP 50 generates pixels for these corresponding planes, depending on the particular spot colors indicated by the document description file 80. It is noted that the display list may not contain pixels for all of the color planes, depending on the specific document description file 80, such as the case where the file 80 contains no MICR spot color indicators.

The RIP 50 processes the document description file 80 and determines whether the file 80 contains any MICR characters. In accordance with an exemplary implementation, the RIP 50 performs this determination by determining whether the rendered display list contains any pixels in the MICR color plane. The RIP 50 communicates an indicator to the press controller 30 to indicate the RIP's detected presence or absence of MICR characters.

Depending on the particular implementation, the RIP 50 may contain one or multiple processors 54 (CPUs, processing cores, etc.) and a memory 56 that contains one or multiple sets of machine executable instructions, called "programs 58," which are executed by the processor(s) 54 for purposes of generating the display list, determining whether MICR characters are present based on the display list, and generating the indicator to the press controller 30 to alert the controller 30 to the detected presence or absence of MICR characters. Although FIG. 1 depicts the RIP 50 as being contained in a single box, the RIP 50 may be formed from multiple components on a rack, from multiple nodes in a distributed processing system, etc. Moreover, the RIP 50 may be implemented entirely in non-processor-based hardware or may be implemented as a combination of non-processor-based hardware and processor-based hardware, in other implementations. Thus, many implementations are contemplated and are within the scope of the appended claims. The memory 56 of the RIP 50 as well as the memory 40 of the press controller 30 are non-transitory memories, such as (as non-limiting examples) semiconductor memories, optical storage memories, magnetic storage memories, removable storage media memories, etc.

Figure 4:
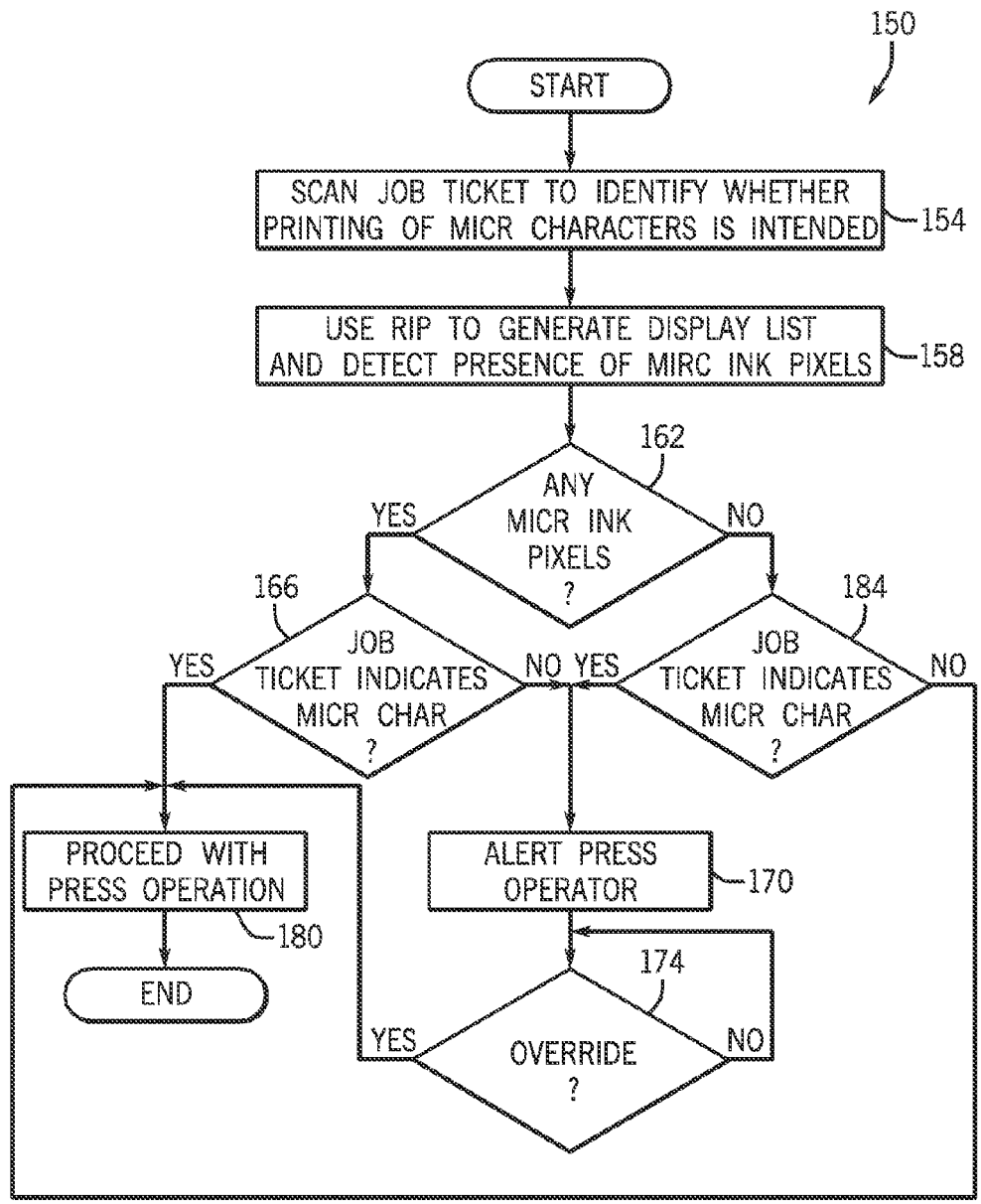

Referring to FIG. 4 in conjunction with FIG. 1, the press controller 30 and the RIP 50 may interact to evaluate the consistency between the intent 72 and the associated document description file 80 regarding MICR characters in accordance with a technique 150. Pursuant to the technique 150, the press controller 30 scans (block 154) the job ticket 70 (i.e., determines whether the intent 72 indicates that the document is to contain MICR characters) to identify whether printing of MICR characters is intended. The RIP 50 is used to generate a display list of color planes to be printed, pursuant to block 158; and the RIP 50 determines from this list whether any MICR ink pixels are present in the display list. The RIP 50 then indicates to the press controller 30 whether or not any MICR characters have been detected in the processed document.

The press controller 30 next decides whether to allow printing to continue. If the intent 72 and RIP 50 are consistent regarding the presence or absence of MICR characters, the press controller 30 allows the printing operation to continue, pursuant to block 180. Otherwise, if the two indications are inconsistent, the press controller 30 alerts (block 170) the human press operator, such by, for example, displaying a notification on the user interface 34 and halting the printing operation until at least a predefined action is taken to acknowledge the discrepancy.

In this manner, if the press controller 34 determines (diamond 162) that one or multiple MICR ink pixels have been generated by the RIP 50 and determines (diamond 166) that the job ticket 70 does not indicate the presence of MICR characters, the two results are inconsistent and the press operator is alerted, pursuant to block 170. Likewise, if the press controller 30 determines (diamond 162) no MICR ink pixels have been generated by the RIP 50 and determines (diamond 184) that the job ticket 70 indicates the presence of MICR characters, then the two results are inconsistent and the press operator is alerted (block 170).

When the alert to the press operator is generated, the press controller 30 may halt the printing operation from occurring until the press controller 30 determines (diamond 174) that the alert has been overridden. As a non-limiting example, in accordance with an example implementation, the user interface 34 allows entry of a specific digital code (by a supervisor, for example through a data input device (keypad, for example), which acknowledges that the press operator (or supervisor) is aware of the MICR character discrepancy between the job ticket 70 and the document description file 80.

It is noted that sometimes the press operator (or the operator's supervisor) may allow printing to occur (and thus, enter the bypass code, for example), even when aware of an inconsistency regarding the MICR characters. For example, the document description file 80 may describe the printing of a document with MICR characters and thus, contain corresponding MICR spot colors. However, the print job may be a job to print proof documents (e.g., "blue line" proofs or customer draft samples), which does not require MICR toner. Thus, for this scenario, the intent 72 properly fails to indicate the presence of MICR characters, and the press operator allows the printing to continue.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    in a machine, processing data indicative of a document to be printed by a printer and which may contain magnetic ink character recognition (MICR) characters to determine whether the data indicates any MICR characters;
    comparing a result of the determination to an intent indicated by a job ticket associated with the document; and
    controlling the printing of the document by the printer, comprising selectively performing corrective action in response to the comparison.

2. The method of claim 1, wherein the act of processing the data comprises:
    generating data indicative of pixels for at least one color plane of a plurality color planes, a given color plane of the plurality of color planes being associated with MICR; and
    determining whether the generating results in data being indicative of at least one pixel for the given color plane associated with MICR.

3. The method of claim 2, wherein the plurality of color planes comprise cyan, magenta, yellow, black and MICR color planes.

4. The method of claim 2, wherein the act of generating the data comprises processing the data indicative of the document to be printed in a raster image processor.

5. The method of claim 1, wherein the act of selectively performing corrective action comprises:
    generating an alert to notify an operator of the printer of an error condition in response to MICR characters being indicated in the data indicative of the document and the job ticket not indicating an intent to print MICR characters.

6. The method of claim 1, wherein the act of selectively performing corrective action comprises:
    generating an alert to notify a human operator of the printer of an error condition in response to MICR characters not being indicated in the data indicative of the document and the job ticket indicating an intent to print MICR characters.

7. The method of claim 1, wherein the act of selectively performing corrective action comprises:
    preventing operation of the printer to print the document in response to an inconsistency between the result of the determination and the intent indicated by the job ticket;
    generating an alert identifying the inconsistency to a human operator of the printer; and
    requesting an override by the operator of the press to print the document.

8. The method of claim 1, wherein the MICR characters are indicated by the data using a spot color indicator.

9. A system comprising:
    a raster image processor to process data indicative of a document to be printed and which may contain magnetic ink character recognition (MICR) characters to determine whether the data indicates any MICR characters; and
    a controller to:
        compare a result of the determination to an intent indicated by a job ticket associated with the document; and
        selectively perform corrective action in response to the comparison.

10. The system of claim 9, further comprising:
    a printer coupled to the raster image processor to print the document in response to data generated by the raster image processor.

11. The system of claim 9, wherein the raster image processor is adapted to:
- generate data indicative of pixels for at least one color plane of a plurality color planes, a given color plane of the plurality of color planes being associated with MICR; and
- determine whether the generating results in data being indicative of at least one pixel for the given color plane associated with MICR.

12. The system of claim 9, wherein the controller is adapted to:
- provide a user interface; and
- generate an alert on the user interface to notify a human operator of the press of an error condition in response to MICR characters being indicated in the data indicative of the document and the job ticket not indicating an intent to print MICR characters.

13. The system of claim 9, wherein the controller is adapted to:
- provide a user interface; and
- generate an alert to notify a human operator of the press of an error condition in response to MICR characters not being indicated in the data indicative of the document and the job ticket indicating an intent to print MICR characters.

14. The system of claim 9, wherein the controller is adapted to:
- provide a user interface;
- prevent operation of the press to print the document in response to an inconsistency between the result of the determination and the intent indicated by the job ticket;
- generate an alert on the user interface to identify the inconsistency to a human operator of the press; and
- request an override by the operator to print the document.

15. The system of claim 9, wherein the MICR characters are indicated by the data using a spot color indicator.

16. An article comprising a machine readable storage medium to store instructions that when executed by at least one processor cause said at least one processor to:
- communicate with a raster image processor to determine whether the raster image processor recognizes the presence of any magnetic ink character recognition (MICR) characters in a document to be printed by a printer;
- compare the determination whether raster image processor recognizes the presence of MICR characters to an intent indicated by a job ticket associated with the document; and
- control the printing of the document by the printer, comprising selectively performing corrective action in response to the comparison.

17. The article of claim 16, the storage medium storing instructions that when executed by said at least one processor cause said at least one processor to:
- provide a user interface; and
- generate an alert on the user interface to notify a human operator of the printer of an error condition in response to MICR characters being indicated in the data indicative of the document and the job ticket not indicating an intent to print MICR characters.

18. The article of claim 16, the storage medium storing instructions that when executed by said at least one processor cause said at least one processor to:
- provide a user interface; and
- generate an alert to notify a human operator of the printer of an error condition in response to MICR characters not being indicated in the data indicative of the document and the job ticket indicating an intent to print MICR characters.

19. The article of claim 16, the storage medium storing instructions that when executed by said at least one processor cause said at least one processor to:
- provide a user interface;
- prevent operation of the press to print the document in response to an inconsistency between the result of the determination and the intent indicated by the job ticket;
- generate an alert on the user interface to identify the inconsistency to a human operator of the press; and
- request an override to print the document.

20. The article of claim 16, wherein the MICR characters are indicated by the data using a spot color indicator.

\* \* \* \* \*